United States Patent [19]

Reid, Jr. et al.

[11] 4,448,290

[45] May 15, 1984

[54] SAFETY DEVICE FOR A CABLE WOUND DRUM

[75] Inventors: Walter L. Reid, Jr.; Robert A. Van Stone; Ralph L. Delano, all of Mattapoisett, Mass.

[73] Assignee: Acushnet Company, New Bedford, Mass.

[21] Appl. No.: 324,006

[22] Filed: Nov. 23, 1981

[51] Int. Cl.³ .................................................. B60T 7/12

[52] U.S. Cl. .................................. 188/82.7; 188/184; 188/189

[58] Field of Search ............... 188/184, 185, 186, 180, 188/189, 82.1, 82.5, 82.7, 82.77, 30, 61, 82.8; 187/89; 242/107.3, 107.4, 84.52 C; 254/318-322; 192/103 A, 103 R, 41, 46, 45.1, 48.92; 182/234

[56] References Cited

U.S. PATENT DOCUMENTS 4,258,832 3/1981 Thorp ................................. 188/184

FOREIGN PATENT DOCUMENTS 128222 6/1945 Australia .
516839 4/1979 Australia .
2433237 1/1976 Fed. Rep. of Germany ...... 188/184
542532 1/1942 United Kingdom .
1042553 9/1966 United Kingdom .
1445480 8/1976 United Kingdom .
1463589 2/1977 United Kingdom .
1480958 7/1977 United Kingdom .
2038269 7/1980 United Kingdom .
2074673 11/1981 United Kingdom .

*Primary Examiner*—Douglas C. Butler
*Attorney, Agent, or Firm*—Eyre, Mann, Lucas & Just

[57] ABSTRACT

The invention relates to an improved safety device for stopping cable payout in an overspeed condition, and particularly to a safety device for securing an object from falling because of failure of a hoisting device. According to the invention, an inertial actuated drum locking mechanism comprises an inertial member mounted on a cable rewind drum. The inertial member is pivotable so that when actuated by inertial force above a predetermined value due to overspeed rotation of the drum, the inertial member moves to engage a fixed member for arresting further motion of the drum. The inertial member is held in place until the outward force exceeds the predetermined value, at which point, the inertial member toggles outward to provide rapid and positive engagement of the locking mechanism.

9 Claims, 4 Drawing Figures

SAFETY DEVICE FOR A CABLE WOUND DRUM

The invention relates to an improved safety device for stopping cable payout in an overspeed condition. It particularly relates to a safety device for securing a lifted object from falling because of failure of the hoisting device. The device thus serves to protect both the object being lifted or lowered and any personnel below who might be harmed by failure of the hoisting device.

Safety devices for the intended purpose herein are known in the art. A typical such safety device includes a drum having one end of a cable attached and wound thereon and the other end of the cable affixed to the object being hoisted. The cable must be of sufficient strength to safely carry the load and withstand the shock of abrupt arrest of cable payout. In conjunction with the drum there is a spring biased inertially sensitive pawl which senses the rotational velocity of the drum due to payout of cable. Cable velocity which causes inertial forces greater than the force of the spring will result in arresting the rotation of the drum to prevent any further payout of the cable.

Whenever the drum begins to rotate at an excessive speed, the pawl engages a fixed, toothed member, but until it reaches this predetermined velocity, the pawl is constantly operating against the spring tension which provides the bias against the pawl. The pawl spring is constantly being flexed by a combination of gravitational and inertial forces acting upon it, the weight of the pawl alternately extends and relaxes the spring on each revolution of the drum. Radial acceleration forces on the pawl also create flexing of the spring because of the constant changes in rotational velocity. Thus, in known devices there is always the chance that metal fatigue due to the constant flexing can cause failure of the safety device at a critical moment The constant flexing can also lead to such weakening of the spring that because of the different tension, the safety device is engaged at cable payout speeds other than that desired and preset in the device.

It has been discovered that the dynamic conditions under which the safety device operates may subject the operator to a further hazard when using the known devices. As the cable approaches the critical payout velocity, the pawl may only hesitantly engage the fixed member or may engage it and then "chatter" down. The partial engagement slows the velocity of the drum and the tension of the spring can cause the inertial member to return towards the rest position. Since the object is falling, the velocity of the cable again increases toward the critical velocity and another partial engagement by the pawl renews the cycle. The safety device therefore acts only as a minor braking device and may barely slow the falling object instead of stopping it. It is evident that the mode of failure created in this manner is potentially harmful to an operator who is expecting the device to provide security The applicant has now discovered an improved safety device which overcomes the disadvantages of these prior art safety devices The inertially actuated drum locking mechanism according to the present invention comprises at least one inertial member mounted on the cable re-wind drum. The inertial member is pivotable so that in a first position the inertial member allows free rotation of the re-wind drum, but when actuated by inertial forces above a predetermined value due to the rotation of the drum, the inertial member moves to a second position where it engages a fixed member to arrest further motion of the drum.

Preferably, the fixed member is a clutch ring fixed to a housing holding the cable re-wind drum. The inertial member is preferably a pawl having a tooth at one end thereof for engagement with the clutch ring whenever the pawl moves to a second position Preferably the pawl is held in position by a directional force provided by a resilient-mounted toggle rod in abutment with one end of the pawl. In the rest position, the direction of force of the toggle rod lies between the pivot point of the pawl and the axis of rotation of the pivot plate. The inward directional component of force provided by the resiliently mounted rod causes the pawl to be held in place until a predetermined inwardly-directed force of the resilient mounting is overcome by the inertial force on the pawl due to the rotation of the drum. Thus, for any rotational velocity of the drum below the preset value of the compression force of the resilient mounting, there is no movement of the active inertial member.

When the inertial force created by the rotational velocity of the drum exceeds the predetermined value of the force of the resilient mounting, the outwardly directed force on the pawl exceeds the inward force of the toggle rod. The pawl pivots outward with a toggling action. Since the line of action of the toggle rod passes through the pivot point as the pawl pivots outward due to the inertial force, the force provided by the toggle rod is now added to the inertial forces impelling the pawl into engagement with the fixed member. Thus a rapid and positive outward motion completes the engagement of the locking device. After actuation, the resilient mounting of the toggle rod holds the pawl in its engaged position until the locking mechanism is manually reset.

The rotational velocity of the drum, or, equivalently, the cable payout velocity at which the locking mechanism actuates, can be varied by increasing or decreasing the compression force applied by the toggle rod.

Preferably, a suitable counterbalancing inertial member is included on the opposite side of the pivot plate for the purpose of counterbalancing the gravitational forces acting on the pawl. While it is not necessary that the counterbalancing inertial member be exactly the same shape, it is preferable in order to provide accurate counterbalancing and it is convenient from a manufacturing standpoint to have both be substantially the same shape.

The active and counterbalancing inertial members are both pivoted near the edge of the pivot plate. Preferably, only one of the inertial members is adapted to operate as a pawl for engaging the toothed ring, the other is simply adapted as a counter weight. It is clear that both of the inertial members could be similarly shaped as active pawls to function to stop the rotation. However, the associated forces of stopping rotation would be absorbed by only one of the inertial members unless the inertial members are positioned and balanced to critical tolerances.

The pivoting point of the pawl is suitably a knife edge. It will be appreciated that other types of pivoting arrangements would be satisfactory in this device. The knife edge pivot is preferred because of the substantial reduction in friction over other pivoting arrangements. The knife edge pivot enables a greater assurance that the inertially determined actuating points are precisely set based on cable payout velocity without having to overcome frictional forces.

The knife edge pivot according to the invention is further adapted for pivoting the inertial member only during its pivoting movement. According to the invention, the knife edge itself is not required to absorb any of the stopping force. When the inertial member is pivoted into engagement with the clutch ring, the opposite end of the inertial member is rotated into abutment with a broad area of the pivot plate itself to ensure that there is a large area for force transmission between the inertial member and the pivot plate.

In a preferred embodiment the active and counterbalance inertial members are preferably linked together so that rotation of one assures a corresponding rotation of the other. Preferably each inertial member further includes a disc portion whose axis is centered on the knife edge and which disc portion rotates in a slot at each end of the pivot plate. The two discs are connected by a tensioned flexible cable loop acting as a belt drive along the circumference of each disc. In addition to achieving the required concurrent rotation, the pressure of the belt drive keeps the knife edges in abutment with a corner of a slot which forms the pivot point for the knife edge on the pivot plate.

There is thus provided a positive locking device which actuates upon a cable attaining a predetermined velocity so that a positive protection for the operators and/or the equipment itself is provided.

These and other features and objects of the invention will be more fully understood from a description of the figures in which.

Figure 1:
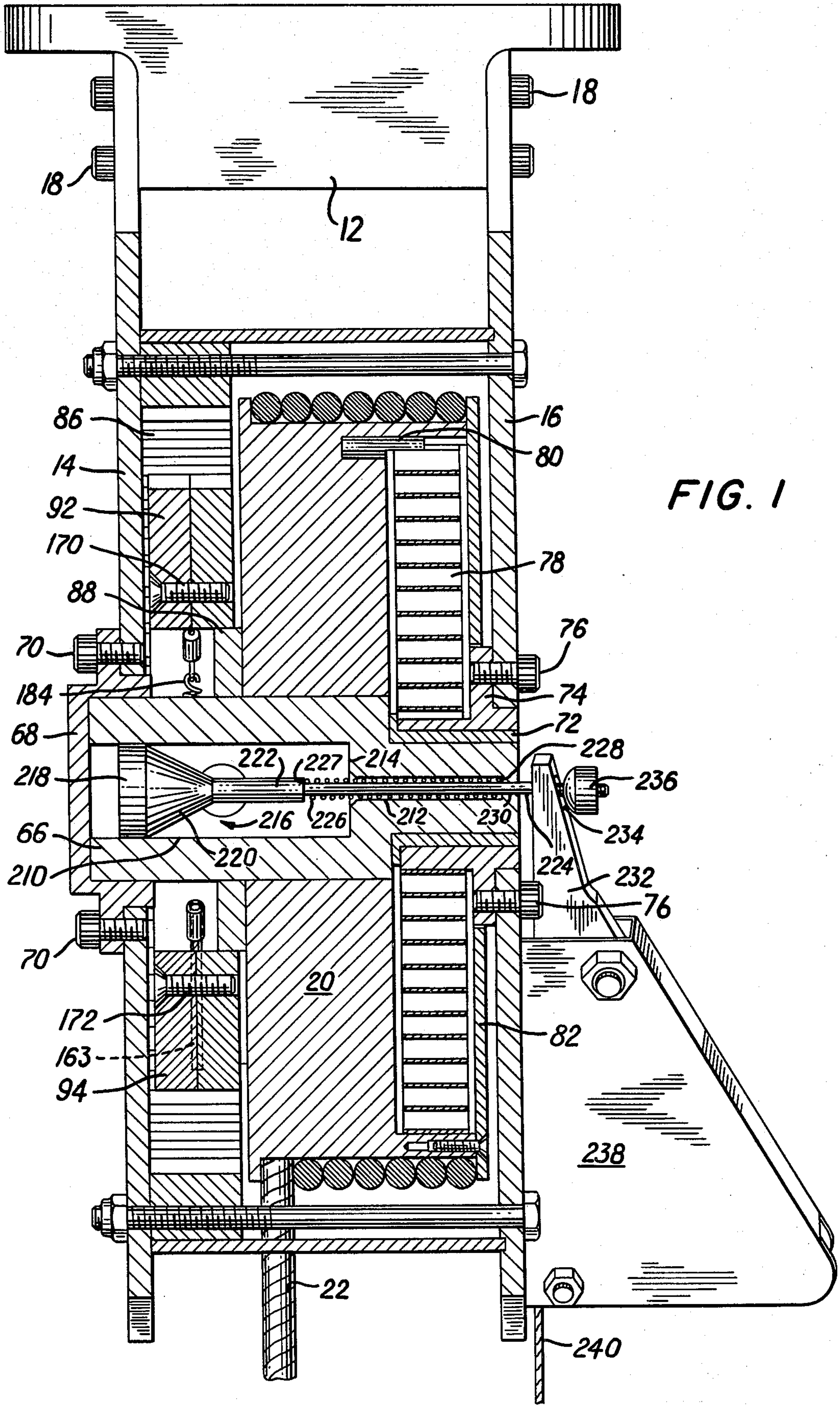
FIG. 1 is a center line section of a device according to the present invention.

In FIG. 1, tie-bar 12 is shown secured between end plates 14 and 16 by cap screws 18. A drum 20 with cable 22 is mounted between end plates 14 and 16 on a drum shaft 66 rotatably mounted at one end thereof in an end plate bearing 68 attached to end plate 14 in conventional manner, suitably cap screws 70. The other end of the drum shaft 66 is rotatably mounted in a spring arbor bearing 72. The spring arbor bearing 72 is fitted into spring arbor 74 affixed to end plate 16, conveniently by cap screws 76.

A power spring 78 is affixed in conventional manner between spring anchor 80 on the drum 20 and the spring arbor 74 and is retained in position by a spring retainer 82. The power spring 78 serves in known manner to provide a light cable return tension, suitably 25 to 30 lbs., for rewinding the cable 22 onto the drum 20 as cable slack occurs during the hoisting of an object.

Concentric with the drum shaft 66 and affixed to the end plate 14, suitably by cap screws 84, (not shown on FIG. 1) is a toothed clutch ring 86. The clutch ring 86 is fixed on the housing so that it will not rotate with the drum 20. Suitably, it is manufactured of steel so as to be sufficiently rugged to withstand a force exerted in arresting the motion of a load attached to the cable 22.

A pivot plate 88 is affixed to the drum 20 by conventional means, suitably cap screws 90 (not shown on FIG. 1)

Figure 2:
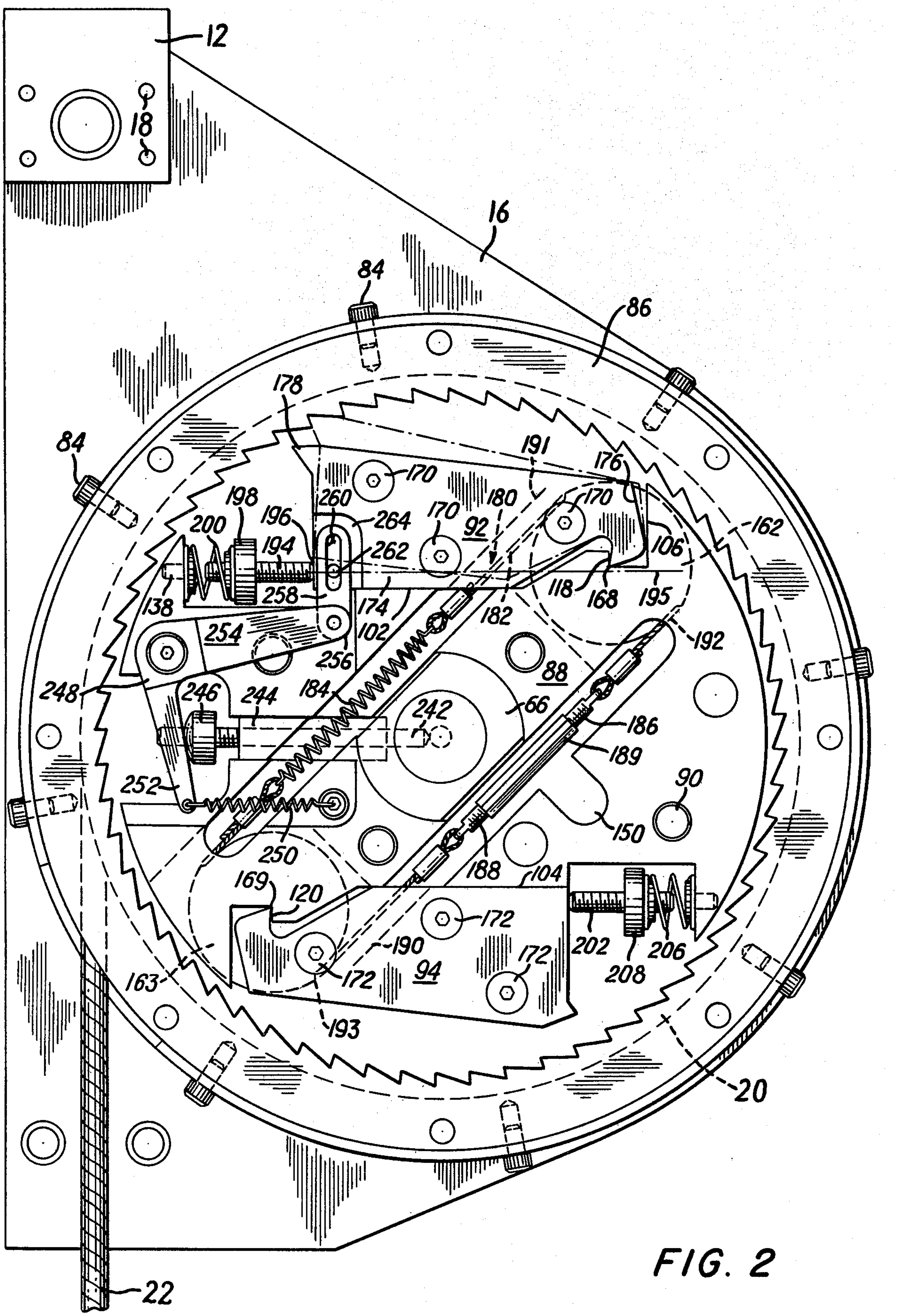
FIG. 2 is a side view with the top end plate removed.

Referring to FIG. 2, active pawl 92 and the inactive, or counterbalance, pawl 94 are shown mounted on pivot plate 88 at diametrically opposite positions thereof. It will be appreciated that any conventional means for pivotally mounting the pawls, including, for example, a stud mounted on the drum 20 as a pivot axis, could be utilized.

It is preferred that each of the pawls comprise a truncated wedge which has a generally trapezoidal shape with one corner at the axis of a generally circular disc member 162, 163 disposed between the front and back sides of the pawl. The truncated wedge portion of the pawl is secured to the circular portion and may be made integral therewith. A knife edge 168,169 is provided on each pawl and rests in abutment against corners 118,120 respectively of the pivot plate. The knife edge is, of course, continued on the opposite side of the circular disc members 162,163. Thus each disc member 162,163 is sandwiched between two truncated wedge portions joined together by conventional fastening means such as screws 170 and 172 to form pawls operative to pivot on a knife edge which forms the axis of the disc members as well.

Figure 3:
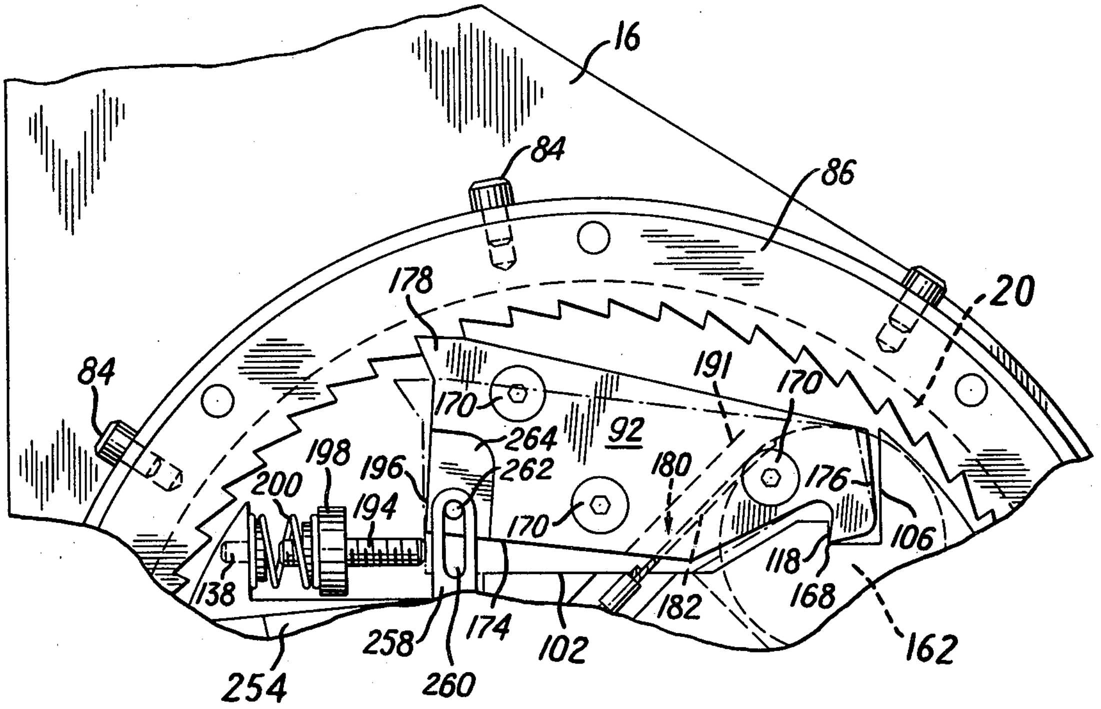
FIG. 3 shows a pawl and associated structure in the engaged position.

In the rest position, as illustrated in FIG. 2, a side 174 of the trapezoidal portion of pawl 92 rests in abutment with side 102 of the middle portion of the pivot plate. As best seen in FIG. 3, in moving to its second position (i.e. actuated) the pawl member 92 is enabled to pivot until its end portion 176 reaches a position in abutment with the shoulder 106 of the pivot plate 88. The pawl 92 has at its upper end opposite from end portion 176 a tooth 178 which is operative in the second position to engage one of the teeth on the toothed clutch ring 86.

When tooth 178 of the pawl 92 is thrown into engagement with one of the teeth in clutch ring 86 by the pivoting of pawl 92, the knife edge 168 is lifted from the corner and end portion 176 is thrown into abutment with the shoulder 106. In this position the pawl 92 is wedged between the toothed clutch ring 86 and the pivot plate 88 so as to prevent any motion of the pivot plate 88. The force associated with the arrest of the motion of the pivot plate, and consequently rotation of the drum 20, is transmitted through the pawl 92 to the shoulder 106 of the slot so that the knife edge 168 is not required to bear any of the arresting force and is utilized only as a bearing surface for the rotation of pawl 92 between the two limiting points.

Pawl 94 is a non-engaging pawl which, as shown, is in almost all respects similar to the pawl 92. The function of this pawl is to act as a counterbalance to the active pawl 92. As shown, this counterbalance pawl has no tooth corresponding to the tooth 178 of pawl 92. Accordingly, there is and can be no engagement of the counterbalance pawl 94 with the clutch ring 86. It will be appreciated by one skilled in the art that unless all of the parts were manufactured and positioned to very close tolerances, only one of the pawl members would actually bear the arresting force even if each had a tooth. For this reason there need be only one active pawl and a counterbalancing member rather than another active pawl.

A cable assembly 180 is looped around the circular disc members 162 and 163 of the pawls 92 and 94, respectively. The cable assembly comprises a first cable portion 182, one end of which is attached in conventional manner to one end of a cable tension spring 184 and the other end of which is attached in like fashion to a turnbuckle screw 186. In similar fashion another cable portion is attached to the other end of cable tension spring 184 and to another turnbuckle screw 188. The turnbuckle screws are threadedly received in turnbuckle body 189 so that the cable assembly 180 may be tightened in conventional manner by operation of the turnbuckle body 189 for the purpose of increasing or decreasing tension. Conveniently the pawls 92 and 94 are slotted internally (dotted lines 190, 191, 192, 193) so that the cable assembly has free access to the disc members 162, 163.

The cable assembly 180 serves to keep the knife edges 168 and 169 in firm abutment with the corners 118 and 120 of the pivot plate 88. Additionally, the cable assembly 180 will communicate any motion of one pawl to the other so as to assure that pivoting of each will occur simultaneously.

According to a preferred embodiment of the invention, a pawl toggle rod 194 is disposed in abutment against a depression 196 in the end of the pawl 92. The pawl toggle rod 194 is suitably a threaded dowel threadingly received in a nut 198 which is affixed in conventional manner to one end of a pawl toggle spring 200. The other end of the toggle spring 200 is fastened to the pivot plate 88 by, for example, a screw threadingly received in threaded hole 138. Conveniently, nut 198 is knurled so as to allow finger adjustment of the compression of the toggle spring 200, thus adjusting the inertial force required to move the pawl to its second position.

In the rest position as illustrated in FIG. 2 the force of the toggle rod 194 is directed along the line 195 which is below the knife edge pivoting axis so that there is an inward directed component of force holding the pawl 92 in the rest position. In FIG. 3 where the pawl 92 is shown in the engaged position, the force of the toggle rod 194 is directed along the line 195 which is above the knife edge pivoting axis creating thereby an outwardly directed component of force.

It will be appreciated that a similar pawl toggle rod 202 may be biased against pawl 94 by spring 206 in order to provide a more positive toggling action. However, it will be evident to one skilled in the art that the use of a second toggle rod is not required for operation.

The operation of the safety device is described in the paragraphs below. The two pawls 92 and 94 are normally held in a fixed restrained position against the sides 102 and 104 of the pivot plate 88 by the force of the pawl toggle rods 194 and 202. The inward pre-load force is the inward component of the force provided by the compression of toggle springs 200 and 206. When this preload force is exceeded by the inertial forces on the pawls, the pawls will pivot outwardly. As the pawl pivots outwardly, the direction of forces applied by the toggle springs 200 and 206 to the respective toggle rods 194 and 202, pass outside of the pawl's knife-edge pivot points (see FIG. 3) and add their force to the inertial forces to force the active pawls 92 into engagement with the clutch ring 86.

Since clutch ring 86 is fixed against rotation, when the active pawl 92 engages the clutch ring 86, the force applied by the clutch ring 86 against the pawl lifts the pawl 92 off its knife-edge pivot and drives the end 176 of the pawl 92 against the broader surface of the shoulder 106 of the pivot plate 88. The engagement forces are thus transferred over a relatively large bearing area. This is a substantial advantage as compared to conventional pivots such as pivot pins and also eliminates the frictional problems encountered with pivot pins.

The rotational velocity at which the pawls will actuate is varied by increasing or decreasing the force applied by the pawl toggle springs 200 and 206. In the embodiment illustrated in FIG. 2, the force is increased by further compressing the toggle springs 200 and 206 by rotation of the knurled nuts 198 and 208 in relation to the pawl toggle rods 194 and 202 respectively.

A typical application of the safety device is to protect workers loading and unloading "book" type rubber compression molds from the possibility of injury in the event of failure of the mold opening hoist. The free end of the cable 22 is attached at a convenient point on the upper mold to be hoisted. Typically, the hoist will lift approximately 1,000 lbs. operating at a maximum speed of 40 ft. per minute, resulting in a rotational speed of 19 rpm for the drum 20 of the safety device. The safety device toggle springs 200 and 206 are suitably adjusted for actuation at 65 rpm, which is equivalent to the velocity of the drum 20 that would be attained after 1 in. of mold cover free fall in the event of hoist failure. After actuation of the safety device, further forces involved in arresting the fall can be absorbed by shock absorbers in known manner.

According to the preferred embodiment of the invention, once the device is actuated it must be manually reset. This is an important safety feature. Suitable manual reset structure is shown in FIGS. 1 and 2.

As seen in FIG. 1, the drum shaft 66 is hollow having a large bore 210 and a smaller bore 212 joined at shoulder 214. Within the large bore 210 is disposed a re-set actuator member 216 which comprises a cylindrical portion 218 slidingly received in the large bore 210. This cylindrical portion 218 narrows down in a conical portion 220 to the circumference of a sleeve 222 which is affixed in a conventional manner to a re-set actuation rod 224. A re-set actuator spring 226 is disposed between shoulder 227 of the sleeve 222 and shoulder 228 at the end of the small bore 212.

The re-set actuation rod 224 passes thru a hole 230 at the end of the drum shaft and is operative to slide back and forth therein against the compression of re-set actuator spring 226.

A re-set lever 232 is pivotally mounted on the exterior of end plate 16. The re-set actuation rod 224 passes thru a hole 234 in the end of the re-set lever 232 and is secured by a re-set actuator nut 236. The re-set lever 232 is pivoted in any suitable manner. Conveniently, the re-set lever 232 is protected by a re-set lever cover 238.

Actuation of the re-set lever may be accomplished by any convenient means; one suitable method is a re-set cable 240 as illustrated.

Turning now to FIG. 2 a re-set rod 242 is shown slidingly received in a re-set rod bearing 244 disposed within the pivot plate 88. Nut 246 is held onto the exterior end of rod 242 for abutment against a bell crank 248 pivotally mounted on the pivot plate 88. A spring 250 attached at one arm 252 of the bell crank 248 is disposed in tension to keep the nut 246 in abutment with the arm 252 of the bell crank rod which further keeps the reset rod 242 in abutment with the reset actuator member 216.

The other arm 254 of the bell crank 248 is pivotally mounted in suitable manner at one end 256 of a slotted member 258 slidingly received on the pawl 92. The slot 260 of the slotted member 258 is in sliding engagement with, for example, a stud 262 in a recessed portion 264 of the pawl 92.

For operation of the reset mechanism after the pawl 92 has engaged the clutch ring 86, the stud 262 will be at the top end of the slot 260. As best seen in FIG. 1, when the re-set actuation lever 232 is moved rightward, the conical portion 220 will slidingly move against the re-set rod 242. As the re-set rod, as seen in FIG. 2, moves leftwardly because of the movement of the re-set actuator 216, the arm 252 of the bell crank 248 will also move leftwardly. The pivoting of the arm 254 will cause the upper end of the slot 260 to pull downwardly against the stud 262. Accordingly, the pawl 92 will be moved back to its rest position from engagement with the clutch ring 86.

It will be evident to one skilled in the art that in order to accomplish the re-set, there must be only slight pressure between the tooth 178 and the clutch ring 88. Thus, resetting of the pawls may take place only in the absence of an applied load, an important safety feature.

Figure 4:
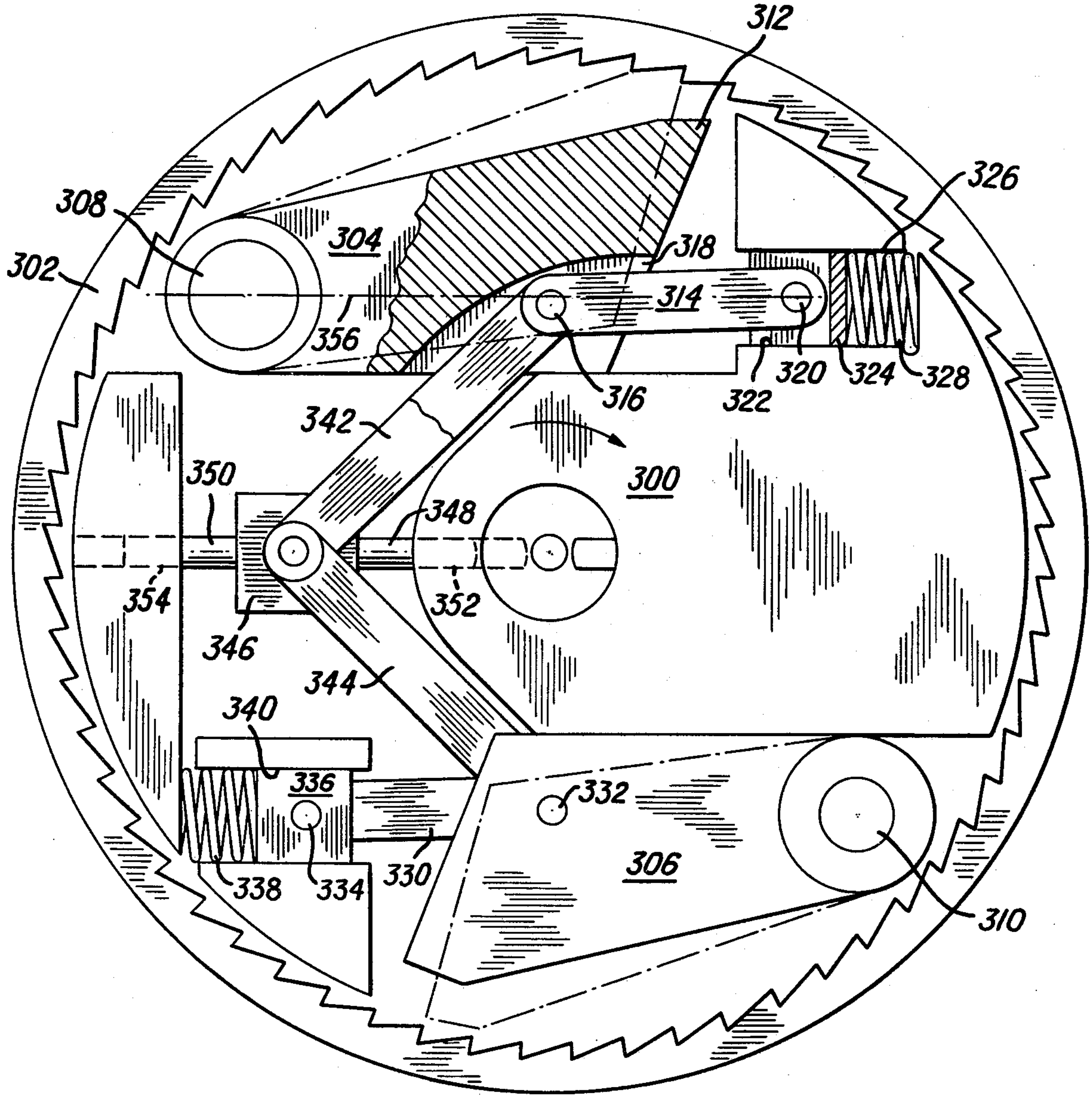
FIG. 4 shows another embodiment of a device according to the present invention.

FIG. 4 illustrates an alternative embodiment of the device according to the invention. In this embodiment, plate 300 which, conveniently, is one end of a rotatable drum such as is illustrated in FIG. 1, is disposed so that it is rotatable within the inner circumference of fixed toothed clutch ring 302.

As in the previous embodiment, active pawl 304 and counterbalance pawl 306 are pivotally mounted at diametrically opposed locations on plate 300. Pawl 304 and pawl 306 are pivoted at one end on pawl shafts 308 and 310 which are affixed to the plate 300 in suitable manner, conveniently, a press fit. The active pawl 304 has a tooth 312 on the outer end portion opposite the pivot end. The counterbalance pawl 306 lacks such a tooth.

In the rest position illustrated, the tooth 312 also lies within the inner circumference of the clutch ring 302. When the pawl 304 pivots outwardly to a second position (shown in dotted lines), the tooth 312 engages the teeth of the toothed clutch ring 302 to prevent any further rotation of the plate 300.

One end of toggle arm 314 pivots on toggle pin 316 in slot 318 at the inner end portion of pawl 304. The other end of toggle arm 314 pivots on guide pin 320 in slot 322 of toggle guide 324. The toggle guide 324 is slidingly received in guide slot 326 in plate 300. Toggle spring 328 is disposed in compression between toggle guide 324 and the outer end of guide slot 326. Preferably, in similar manner, toggle arm 330 is pivoted at toggle pin 332 of counterbalance pawl 306 and guide pin 334 of toggle guide 336. Spring 338 is disposed between the toggle guide 336 which is slidingly received in slot 340 and the end of slot 340.

Equalizer bars 342 and 344 are pivotally connected to equalizer block 346 which has rods 348 and 350 at each end thereof. The rods 348 and 350 are slidingly received in guide bores 352 and 354 for reciprocating operation therein.

In the rest position illustrated, the toggle pin 316 is arranged so that it is inward of the line 356 passing through the centers of shaft 308 and guide pin 320. Since toggle spring 328 is disposed in compression there is an inwardly directed component of force on the toggle pin 316 which tends to hold the pawl 304 in its rest position during rotation of the plate. When the rotational velocity exceeds a predetermined value so that the inertial force on the pawl 304 overcomes the inward component of force, the pawl 304 pivots outwardly into its second position. Because of the toggling action, in this position the toggle pin 316 is outward of line 356 so that the compressive force of spring 328 provides an outwardly directed component of force to hold the pawl 304 in its second position.

The equalizer bars 342 and 344 attached to pawls 304 and 306 and to equalizer block 346 equalize the actuation so that both pawls 304 and 306 will always move concurrently.

Reset of the device may be accomplished in any convenient manner by moving the equalizer block 346 leftward as seen in FIG. 4.

It will be understood that the claims are intended to cover all changes and modifications of the preferred embodiments of the invention herein chosen for the purpose of illustration which do not constitute departures from the spirit and scope of the invention.

What is claimed is:

1. A safety device for stopping cable payout from a drum when the rotational speed of the drum exceeds a predetermined level comprising:

(a) a housing;
(b) a drum rotatably mounted in said housing;
(c) a cable, said cable being adapted for winding on said drum upon rotation of said drum in one direction and for being paid out from said drum upon rotation of said drum in the opposite direction;
(d) a plate mounted on an end of said drum for rotation therewith;
(e) a ring-shaped member fixed on said housing, said ring-shaped member surrounding said plate and being in the plane thereof;
(f) a pawl pivotally mounted on said plate;
(g) said pawl having a first and a second position;
(h) said pawl in said first position enabling rotation of said drum;
(i) said pawl in said second position engaging said ring-shaped member to arrest rotation of said drum;
(j) said pawl being operative to pivot from said first position to said second position by inertial forces generated on said pawl by rotation of said drum;
(k) biased toggling means for holding said pawl under bias in said first position until the rotational speed of the drum attains a predetermined value;
(l) said toggling means thereafter holding said pawl under bias in said second position; and
(m) said pawl having a tooth at one end thereof for engagement with said ring-shaped member when said pawl is in said second position the other end of said pawl being in abutting engagement with a shoulder of the plate when said pawl is in said second position, a knife edge on said pawl engaging an opposed shoulder in said recess of the plate when the pawl is in said first position.

2. The safety device of claim 1 wherein said ring-shaped member is a toothed clutch ring having a plurality of teeth in the interior thereof and said pawl is an active pawl having a tooth thereon for engaging abutment against a tooth of said ring-shaped member.

3. The safety device of claim 2 further comprising a counterbalance pawl pivotally mounted on said plate diametrically opposed to said active pawl.

4. The safety device of claim 3 wherein said counterbalance pawl is essentially identical to said active pawl except for the tooth thereon.

5. The safety device of claim 1 further comprising resetting means for returning said pawl from its second position to its first position.

6. The safety device of claim 1 wherein said active and said counterbalance pawls have knife-edge portions defining the pivoting axis of each of the pawls and the knife edges of each pawl are in pivoting abutment with said plate.

7. The safety device of claim 6 wherein upon engaging abutment of the active pawl with the ring shaped member the knife edge portions of said active pawl are lifted from pivoting abutment and an end of said active pawl is thrown into abutment with said plate.

8. A safety device for a hoist comprising:

(a) a housing;

(b) a drum rotatably mounted on said housing;

(c) a pawl;

(d) said pawl being pivotally mounted on said drum for rotation therewith;

(e) a clutch ring fixed on said housing;

(f) said pawl having a first position operative to allow free rotation of said (g) said pawl having a second position wherein said pawl is in engagement with said clutch ring wherein said drum is prevented from rotation;

(h) said pawl being operative to pivot from said first position to said second position by the inertial forces acting upon said pawl due to rotation of said drum;

(i) biased toggling means for holding said pawl under bias in said first position until the rotational velocity of said drum attains a predetermined value;

(j) said toggling means thereafter holding said pawl under bias in said second position;

(k) a reset lever pivotally mounted on said housing;

(l) a reset actuation rod which is connected to said reset lever and moves with said reset lever;

(m) a reset actuator member which is attached to said reset actuation rod, said reset actuator member including a conical section;

(n) a reset rod in abutting relationship with said conical section;

(o) an arm connected to said pawl and to said reset rod; and (p) said arm being effective to move said pawl from the second position to the first position when said reset lever is pivoted.

9. In a safety device for stopping cable payout from a drum rotatably mounted in a housing when the rotational speed of the drum exceeds a predetermined level, by inertial means operative to react to inertial forces of rotation on said drum for motion-arresting engagement with a fixed member on said housing, the improvement wherein said inertial means comprises a pawl movable between first and second positions, said pawl having a tooth at one end thereof for engagement with a toothed wheel of said drum when said pawl is in said second position, the other end of said pawl being in abutting engagement with a shoulder of a pivot plate when said pawl is in said second position, a knife edge on said pawl engaging an opposed shoulder in said recess of the pivot plate when the pawl is in said first position, biased toggling means for holding said pawl under bias in said first position enabling free rotation of said drum when said drum is rotating at rotational velocities below a predetermined rotational velocity and said toggling means holding said pawl under bias in said second position after said drum exceeds said predetermined velocity.

* * * * *

UNITED STATES PATENT AND TRADEMARK OFFICE

CERTIFICATE OF CORRECTION

PATENT NO. : 4,448,290

DATED : May 15, 1984

INVENTOR(S) : Walter L. Reid, Jr.; Robert A. Van Stone; Ralph L. Delano

It is certified that error appears in the above-identified patent and that said Letters Patent are hereby corrected as shown below:

Column 1, line 30, after the word "it", change "," to --;--.

Column 1, line 61, after the word "devices", add --.--.

Column 2, line 8, after the word "position", add --.--.

Column 2, line 54, after the word "ring", change "," to --;--.

Column 9, line 14, after the word "said", add --drum;--.

Signed and Sealed this

*Twenty-sixth* Day of *March 1985*

[SEAL]

*Attest:*

DONALD J. QUIGG

*Attesting Officer* *Acting Commissioner of Patents and Trademarks*